(12) United States Patent
Lu

(10) Patent No.: US 11,145,344 B1
(45) Date of Patent: Oct. 12, 2021

(54) ONE TIME PROGRAMMABLE ANTI-FUSE PHYSICAL UNCLONABLE FUNCTION

(71) Applicant: Synopsys, Inc., Mountain View, CA (US)

(72) Inventor: Xiaojun Lu, Ontario (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/986,957

(22) Filed: Aug. 6, 2020

(51) Int. Cl.
*G11C 8/20* (2006.01)
*G11C 17/18* (2006.01)
*G11C 17/16* (2006.01)

(52) U.S. Cl.
CPC .............. *G11C 8/20* (2013.01); *G11C 17/16* (2013.01); *G11C 17/18* (2013.01)

(58) Field of Classification Search
CPC ...................................................... G11C 8/20
USPC ............................................................ 365/96
See application file for complete search history.

(56) References Cited

U.S. PATENT DOCUMENTS

| | | | | |
|---|---|---|---|---|
| 6,570,795 B1* | 5/2003 | Fricke | ............ | G11C 17/00 365/100 |
| 9,754,678 B2* | 9/2017 | Byun | ............ | G11C 17/18 |
| 2010/0202183 A1* | 8/2010 | Kurjanowicz | ...... | G11C 17/18 365/94 |
| 2019/0385680 A1* | 12/2019 | Dunga | ........... | G11C 16/0466 |

* cited by examiner

*Primary Examiner* — Muna A Techane
(74) *Attorney, Agent, or Firm* — Sterne, Kessler, Goldstein & FoxPLLC

(57) ABSTRACT

A method includes performing a first read operation on a memory cell of a programmed first one-time programmable (OTP) anti-fuse to determine a state of the memory cell based on a first parameter level, performing a second read operation on the memory cell of the programmed first OTP anti-fuse to determine the state of the memory cell based on a second parameter level, identifying the memory cell of the first OTP anti-fuse as an uncertain bit when the state determined during the first read operation and the state determined during the second read operation are different, and programing one or more memory cells of a second OTP anti-fuse based on a bit position of the identified uncertain bit of the first OTP anti-fuse.

20 Claims, 7 Drawing Sheets

400

| OTP PUF keyword current levels 402 | 0.91 | 0.44 | 0.53 | 0.69 | 0.84 | 0.74 | 0.79 | 0.58 | ... | 0.49 | 0.59 |
|---|---|---|---|---|---|---|---|---|---|---|---|
| Cell position 404 | cell_0 | cell_1 | cell_2 | cell_3 | cell_4 | cell_5 | cell_6 | cell_7 | ... | cell_n-2 | cell_n-1 |

| OTP PUF key word 102 | cell_0 | cell_1 | cell_2 | cell_3 | cell_4 | cell_5 | cell_6 | cell_7 | ... | cell_n-2 | cell_n-1 |
|---|---|---|---|---|---|---|---|---|---|---|---|
| OTP PUF pairing word 104 | cell_0 | cell_1 | cell_2 | cell_3 | cell_4 | cell_5 | cell_6 | cell_7 | ... | cell_n-2 | cell_n-1 |

| OTP PUF keyword current levels 402 | 0.91 | 0.44 | 0.53 | 0.69 | 0.84 | 0.74 | 0.79 | 0.58 | ... | 0.49 | 0.59 |
|---|---|---|---|---|---|---|---|---|---|---|---|
| Cell position 404 | cell_0 | cell_1 | cell_2 | cell_3 | cell_4 | cell_5 | cell_6 | cell_7 | ... | cell_n-2 | cell_n-1 |

| OTP PUF keyword state 502 | 1 | 0 | 0 | 0/1 | 1 | 0/1 | 1 | 0/1 | ... | 0 | 0/1 |
|---|---|---|---|---|---|---|---|---|---|---|---|
| Cell position 504 | cell_0 | cell_1 | cell_2 | cell_3 | cell_4 | cell_5 | cell_6 | cell_7 | ... | cell_n-2 | cell_n-1 |

| OTP PUF pairing word 602 | U | U | U | P | U | P | U | P | ... | U | P |
|---|---|---|---|---|---|---|---|---|---|---|---|
| Cell position 604 | cell_0 | cell_1 | cell_2 | cell_3 | cell_4 | cell_5 | cell_6 | cell_7 | ... | cell_n-2 | cell_n-1 |

| OTP PUF keyword 802 | 1 | 0 | 0 | 1 | 1 | 1 | 0 | ... | 0 | 0 |
|---|---|---|---|---|---|---|---|---|---|---|
| OTP PUF pairing word 804 | 0 | 0 | 0 | 1 | 0 | 1 | 1 | ... | 0 | 1 |

FIG. 8

| OTP PUF keyword 902 | 1 | 0 | 0 | x | 1 | x | 1 | x | ... | 0 | x |
|---|---|---|---|---|---|---|---|---|---|---|---|
| Cell position 904 | cell_0 | cell_1 | cell_2 | cell_3 | cell_4 | cell_5 | cell_6 | cell_7 | ... | cell_n-2 | cell_n-1 |

ONE TIME PROGRAMMABLE ANTI-FUSE PHYSICAL UNCLONABLE FUNCTION

TECHNICAL FIELD

The present disclosure relates generally to a one time programmable system. In particular, the present disclosure relates to a one time programmable anti-fuse physical unclonable function.

BACKGROUND

A physical unclonable function (PUF) is a physically-defined keyword that serves as a unique identifier for a semiconductor device such as a microprocessor. The PUF is a physical entity embodied in a physical structure. PUFs are based on unique physical variations which occur naturally during semiconductor manufacturing or post processing. PUFs are usually implemented in integrated circuits and are typically used in applications with high security requirements, more specifically, cryptography.

SUMMARY

In one aspect, a method includes performing a first read operation on a memory cell of a programmed first one-time programmable (OTP) anti-fuse to determine a state of the memory cell based on a first parameter level, performing a second read operation on the memory cell of the programmed first OTP anti-fuse to determine the state of the memory cell based on a second parameter level, identifying the memory cell of the programmed first OTP anti-fuse as an uncertain bit when the state determined during the first read operation and the state determined during the second read operation are different, and programing one or more memory cells of a second OTP anti-fuse based on a bit position of the identified uncertain bit of the programmed first OTP anti-fuse.

In one aspect, a method includes performing a first read operation on memory cells of a first one-time programmable (OTP) anti-fuse, performing a second read operation on the memory cells of a second OTP anti-fuse to determine a programmed/unprogrammed state of the memory cells of the second OTP anti-fuse, and masking a portion of the memory cells of the first OTP anti-fuse based on the second read operation, wherein the masked memory cells correspond to uncertain bits of the first OTP anti-fuse.

In one aspect, a system includes a memory storing instructions, and a processor, coupled with the memory and to execute the instructions. The instructions when executed cause the processor to perform operations including perform a first read operation on a memory cell of a programmed first OTP anti-fuse to determine a state of the memory cell based on a first parameter level, perform a second read operation on the memory cell of the programmed first OTP anti-fuse to determine the state of the memory cell based on a second parameter level, identify the memory cell of the programmed first OTP anti-fuse as an uncertain bit when the state determined during the first read operation and the state determined during the second read operation are different, and program one or more memory cells of a second OTP anti-fuse based on a bit position of the identified uncertain bit of the first OTP anti-fuse.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 illustrates a physical unclonable function (PUF) key, in accordance with an embodiment of the present disclosure.

FIG. 4 illustrates an example of normalized programmed cell currents of a one-time programmable (OTP) PUF keyword, in accordance with an embodiment of the present disclosure.

FIG. 5 illustrates a read out of an OTP PUF keyword during programming, in accordance with an embodiment of the present disclosure.

FIG. 6 illustrates a read out of an OTP PUF pairing word during programming, in accordance with an embodiment of the present disclosure.

FIG. 8 illustrates a read out of the OTP PUF keyword and the OTP PUF pairing word during application read, in accordance with an embodiment of the present disclosure.

FIG. 9 illustrates a read out of the PUF key during application read, in accordance with an embodiment of the present disclosure.

DETAILED DESCRIPTION

Figure 2:
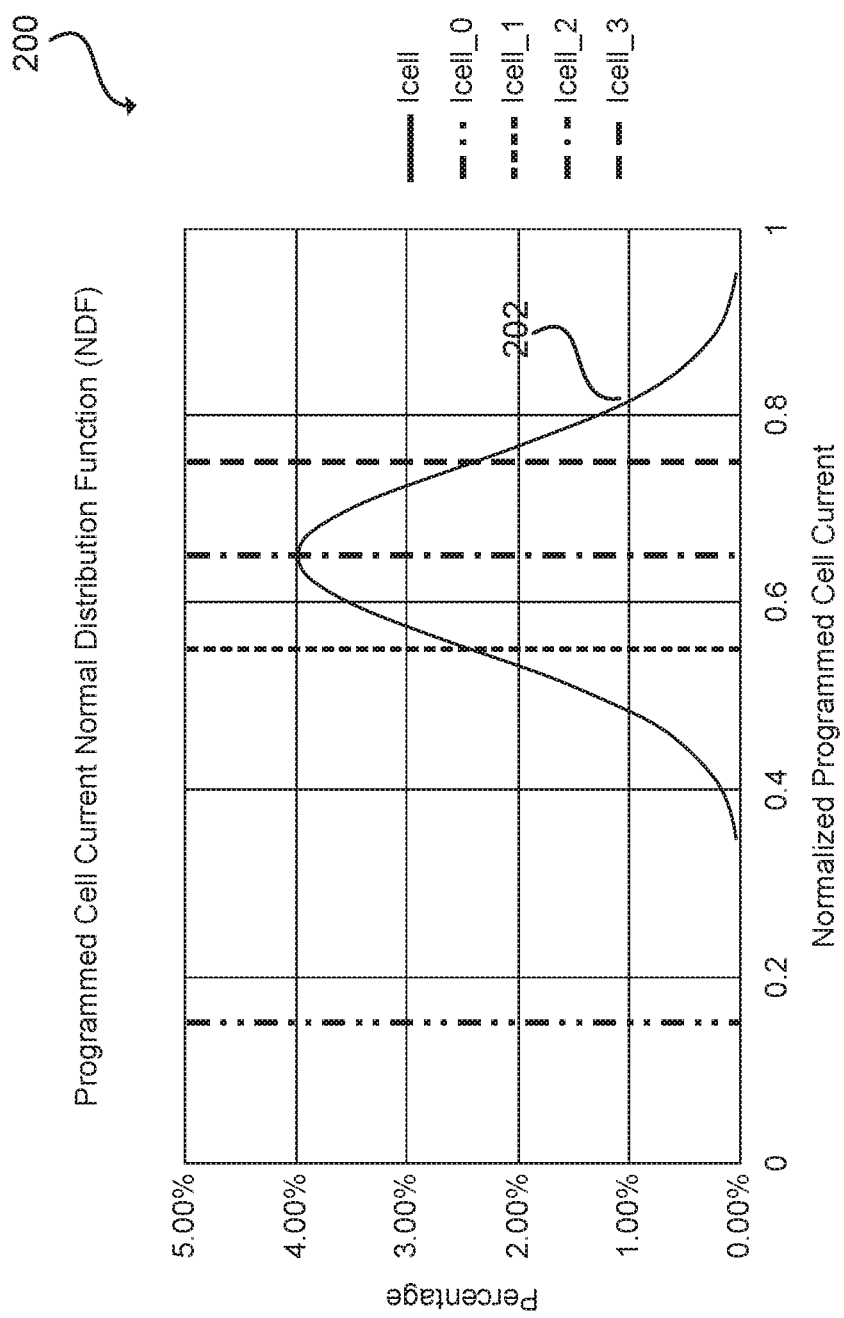
FIG. 2 illustrates an example graph of a normalized programmed cell current distribution function, in accordance with an embodiment of the present disclosure.

Aspects of the present disclosure relate to a one time programmable (OTP) anti-fuse physical unclonable function (PUF).

To be physically unclonable, the PUF key includes the following properties: physical inspection of the silicon die (e.g., imaging and reverse engineering) does not expose the key information and the key is physically available when the chip is powered on. With other protection techniques during chip power on, an adversary may not retrieve the key.

The PUF key can be implemented with one-time programmable (OTP) anti-fuses. An OTP anti-fuse is a type of non-volatile memory (NVM). Typically, a relatively high programming voltage (e.g., from about 5V to about 10V) is applied to the OTP anti-fuse to break down the gate oxide of the anti-fuse cell transistor to create a conductive channel between the gate and the channel for data writing. This type of gate oxide breakdown is a permanent irreversible physical damage. The OTP anti-fuse has advantages of small area, low power, high reliability, and fast read.

A OTP anti-fuse memory product can generate programmed cells with break-down transistor gate oxide showing stable and sufficiently high conductivity which can be used to differentiate programmed cells from unprogrammed cells. The conductivity of well-programmed OTP cells can be represented with programmed cell currents which typically show a normal distribution. Due to the nature of silicon and silicon manufacturing, the relatively low or high conductivity of break-down transistor gate oxide happens randomly on each cell position. In addition, a PUF keyword may be generated with programmed OTP cells because the low or high conductivity of the break-down transistor gate cannot be detected by physical inspection. In the PUF keyword, a low-conductive cell may represent a binary 0 (or low state) and a high-conductive cells may represent a binary 1 (or high state), or vice versa.

The conductivity of programmed OTP anti-fuse cells suffers variations of die-to-die processing, power supplies, temperatures, aging, and the like. Such variations can impact the stability of an OTP PUF word. Therefore, improvement on OTP PUF stability is desired. The OTP anti-fuse PUF scheme described herein provides high stability performance.

The approaches described herein provide a scheme to generate a PUF key with an all-cell-programmed OTP PUF keyword (OTP anti-fuse) and a partial-cell-programmed OTP PUF pairing word by using multiple read operations with different read conditions to define the PUF with binary 0 and 1, as well as to mask out all the uncertain bits on the OTP PUF keyword. With well-developed design and program/read methodologies of OTP words, desired conductivity levels are defined to increase the margins of the application read of the PUF key as will described further below. With increased margins, the OTP anti-fuse PUF scheme described herein can achieve improved stability of the PUF key over all the silicon and operation variations such as die-to-die variation, supply power variation, temperature variation, and the like as would be understood by one of ordinary skill in the art.

In one embodiment, a PUF keyword is generated by first programming all cells, or bits, of an OTP anti-fuse or word by applying a relatively high programming voltage on gates of cell transistors of the OTP word and a relatively low voltage at the transistor channels to break down the gate oxide. After programming, each cell on the OTP word shows some degree of conductivity. Therefore, with a desired read voltage on the cell gates and a desired read time length, all programmed cells read out as high or binary 1 when they are compared with a relatively low conductivity level L0. For example, the desired read time length may be in a range from about 10 ns to about 1000 ns). Unprogrammed cells read out as low or binary 0 when compared with the low conductivity level L0. As discussed above, by the nature of silicon and silicon manufacturing, each programmed cell with breakdown gate oxide show different conductivity levels randomly at different cell positions on the OTP word.

Furthermore, two read operations are performed on the programmed OTP word. During a first read operation, all the programmed cells are compared with a high conductivity level L1, which is selected to be higher than L0. As a result, programmed cells with relatively low conductivity are read out as low state or binary 0 and cells with relatively high conductivity are read out as high state or binary 1. The cells being read out as binary 0 during the first read are regarded as 0s of the PUF keyword. During the second read operation, all the programmed cells are compared with another high conductivity level L3, which is selected to be greater than L1. As a result, programmed cells with relatively high conductivity are read out as high state or binary 1 and cells with relatively low conductivity are read out as low state or binary 0. The cells being read out as binary 1 during the second read operation are regarded as 1s of the PUF keyword. All the cells that were read out as 1 during the first read and were read out as 0 during the second read are regarded as uncertain bits which need to be masked out during the application read of the PUF keyword. Therefore, after the two read operations, all programmed cells on the OTP word can be divided into three groups, one group with low conductivities, one group with medium conductivities and one group with high conductivities. To generate the PUF keyword, cells with low conductivities are assigned as 0s of the PUF keyword, and cells with high conductivities are assigned as 1s of the PUF keyword. Meanwhile, cells with medium conductivities are assigned as uncertain bits and their respective cell positions on the OTP word are recorded and are used for PUF keyword application read mask-out. A programmed OTP word is referred to as an OTP PUF keyword.

To be able to mask out the uncertain bits of the OTP PUF keyword, a second OTP word is programmed as a pairing word of the OTP PUF keyword programmed in the first step. On the pairing word, all the cells at the same cell positions as the uncertain bits of the OTP PUF keyword are programmed, while all other cells are not programmed. In one embodiment, all the cells at the same cell positions as the uncertain bits of the OTP PUF keyword are unprogrammed while all other cells are programmed. As introduced above, when compared with the low conductivity level L0, all programmed cells on the pairing OTP word are read out as high state or binary 1 and all unprogrammed cells are read out as low state or binary 0. Therefore, during the PUF keyword application read, bit positions of all the uncertain bits of the OTP PUF keyword can be identified by reading the pairing OTP word with the conductivity level L0. As a result, all the uncertain bits of the OTP PUF keyword can be masked out. Therefore, one PUF key includes two OTP words (OTP anti-fuse), a first OTP word represents an OTP PUF keyword and a second OTP word represents an OTP PUF pairing word.

During the application read of the PUF word, two read operations are performed to read out the PUF keyword. During the first read operation, all the cells on the OTP PUF keyword are compared with a predetermined high conductivity level L2, which is selected to be higher than conductivity level L1 but lower than conductivity level L3. With good margins between L1 and L2 as well as between L2 and L3, all the 0s of the PUF key on the OTP PUF keyword are read out as binary 0 and all the 1s of the PUF key on the OTP PUF keyword are read out as binary 1. For example, a read margin improvement may be from about 10% to about 30%. Meanwhile, uncertain bits of the OTP PUF keyword are read out as either binary 0 or 1. All these uncertain bits masked out based on performing a second read operation on the OTP PUF pairing word. During the second read operation, all the cells on the OTP PUF pairing word are compared with the low conductivity level L0, which is selected to be lower than conductivity level L1. After the second read operation, the bit position information of all the is on the OTP PUF pairing word are used to mask out all the uncertain bits of the OTP PUF keyword. In one embodiment, the OTP PUF pairing word is read prior to the OTP PUF keyword.

FIG. 1 illustrates a physical unclonable function key, in accordance with an embodiment of the present disclosure. In one embodiment, a PUF key 100 can be generated by two OTP words. A first word may be referred to as an OTP PUF keyword 102 containing all the 0s and 1s of the PUF key, and a second word is referred to as an OTP PUF pairing word 104 used to mask out the uncertain bits on the OTP PUF keyword. All cells of the OTP PUF keyword 102 are programmed. Programmed cells with relatively low conductivity on the OTP PUF keyword 102 are designated as 0s of the PUF key, while programmed cells with relatively high conductivity on the OTP PUF keyword 102 are designated as 1s of the PUF key as described previously herein. The programmed cells with medium conductivity are designated as uncertain bits and cell positions of the uncertain bits on the OTP PUF keyword 102 are recorded on the OTP PUF pairing word 104 by programming. To program the OTP PUF pairing word 104, all cells with the same cell positions as the uncertain bits of the OTP PUF keyword 102 are programmed. During the application read of the PUF key 100, the PUF key information can be read out from the OTP PUF keyword 102 and the uncertain bits of the OTP PUF keyword 102 are masked out by the cell position information read out from the programmed bits on the OTP PUF pairing word 104. In the OTP PUF scheme described herein, by introducing the OTP PUF pairing word 104 to mask out programmed cells with medium conductivity on the OTP PUF keyword 102, the stability of the OTP PUF key is improved.

In the following description, a normalized programmed cell current Ica' is used as an example to represent the conductivity of the OTP programmed cells as well as the threshold of the OTP read operation. People skilled in the art will understand that other OTP read parameters, such as read voltage level or read pulse time length or all combined, can be utilized as well in the read operation of the OTP PUF words.

FIG. 2 illustrates an example graph 200 of a normalized programmed cell current distribution function (NDF), in accordance with an embodiment of the present disclosure. An OTP anti-fuse memory product may generate programmed cells with stable and relatively high cell currents. Cell currents of well-programmed OTP cells typically have a normal distribution as shown by waveform 202. The programmed cell current levels are randomly occurring across the cell positions on the OTP word or in the OTP memory array.

Figure 3:
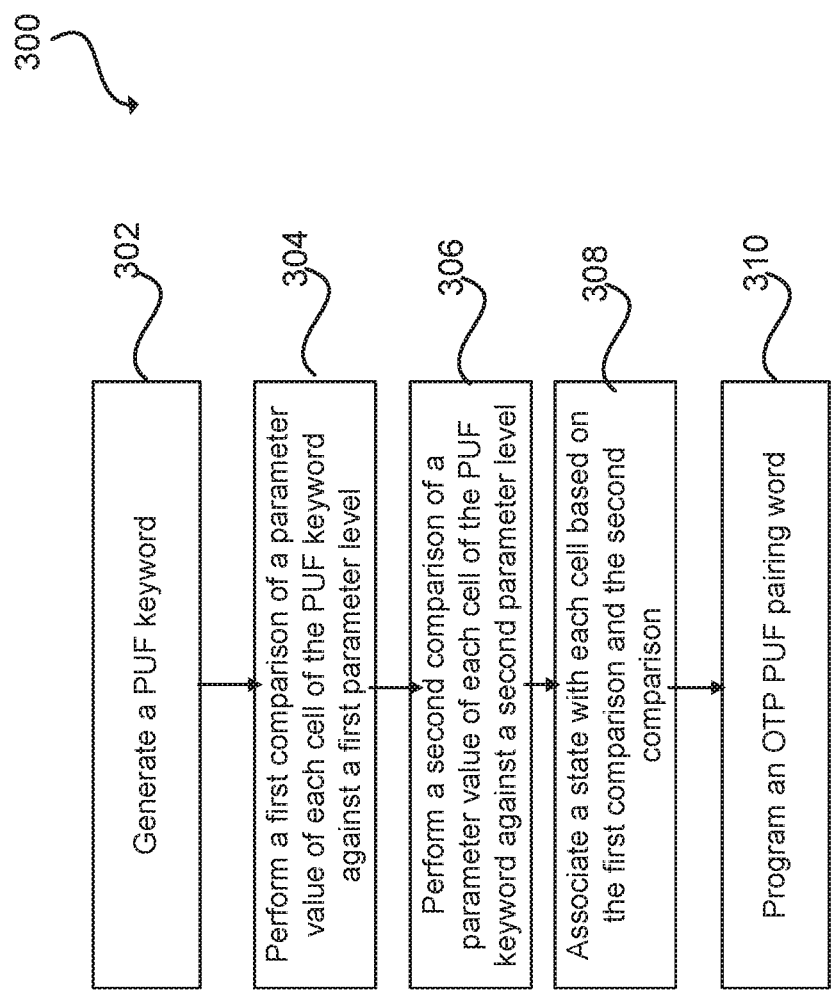
FIG. 3 depicts a flowchart for a process for generating the PUF key, in accordance with an embodiment of the present disclosure.

FIG. 3 depicts a flowchart for a process 300 for generating a PUF key, in accordance with an embodiment of the present disclosure.

At 302, a PUF keyword is generated based on programming all cells (memory cells), or bits, of an OTP word (a first OTP anti-fuse) by applying a relatively high programming voltage on gates of cell transistors of the OTP word and a relatively low voltage at the transistor channels to break down the gate oxide. In one embodiment, one or more programmed cells of the OTP word may read as unprogrammed if the cell current of the programmed cell is below L0.

FIG. 4 illustrates an example of normalized programmed cell currents of an OTP PUF keyword, in accordance with an embodiment of the present disclosure. Cell current levels are randomly occurring on each cell position due to the nature of silicon and silicon manufacturing. Table 400 shows the OTP PUF keyword current levels 402 and the corresponding cell position 404.

At 304, all the programmed cells of the PUF keyword are read. The present system performs a first comparison of a parameter value of each programmed cell against a first parameter level. The parameter value may be a parameter associated with a conductivity of the memory cell. The first parameter level may include a first conductivity level or a current level representative of the first conductivity level. For example, the current level of each programmed cell is compared with a first current level $I_{cell\_1}$.

At 306, all the programmed cells of the PUF keyword are read again. The present system performs a second comparison of a parameter value of each programmed cell against a second parameter level. For example, the current level is compared with a second current level $I_{cell\_3}$. In this example, $I_{cell\_1}$ equals to 0.55 and $I_{cell\_3}$ equals to 0.75. Both are normalized current numbers. $I_{cell\_1}$ and $I_{cell\_3}$ as shown in FIG. 2.

At 308, a state is associated with each cell of the PUF key based on the first comparison and the second comparison. For example, programmed cells with a cell current lower than the first current level $I_{cell\_1}$ are designated as binary 0 of the PUF key, and programmed cells with a cell current higher than the second current level $I_{cell\_3}$ are designated as binary 1 of the PUF key. Cells with cell current in between the first current level $I_{cell\_1}$ and the second current level $I_{cell\_3}$ are designated as uncertain bits or 0/1. FIG. 5 illustrates a read out of an OTP PUF keyword during programming, in accordance with an embodiment of the present disclosure. Table 500 shows OTP PUF keyword state 502 and cell position 504.

At 310, a second OTP anti-fuse (i.e., an OTP PUF pairing word) is programmed as the OTP PUF pairing word to the programmed OTP PUF keyword. All the cells of the OTP PUF pairing word with the same cell positions designated as uncertain bits on the OTP PUF keyword are programmed.

FIG. 6 illustrates a read out of an OTP PUF pairing word during programming, in accordance with an embodiment of the present disclosure. Table 600 shows the OTP PUF pairing word 602 and the cell position 604. Cells having the same cell positions as uncertain bits of the OTP PUF key word are programmed as indicated by "P" in FIG. 6. All other cells are not programmed as indicated by "U" in FIG. 6. As shown in FIG. 2, programmed cells and unprogrammed cells on the OTP PUF pairing word can be differentiated and read out by comparing their respective cell currents with a third current level lower than $I_{cell\_1}$. In one embodiment, the third current level is $I_{cell\_0}$.

During application, the read of the PUF key is performed as described below. The PUF key includes two programmed OTP words, one as the OTP PUF keyword and the other as the OTP PUF pairing word.

Figure 7:
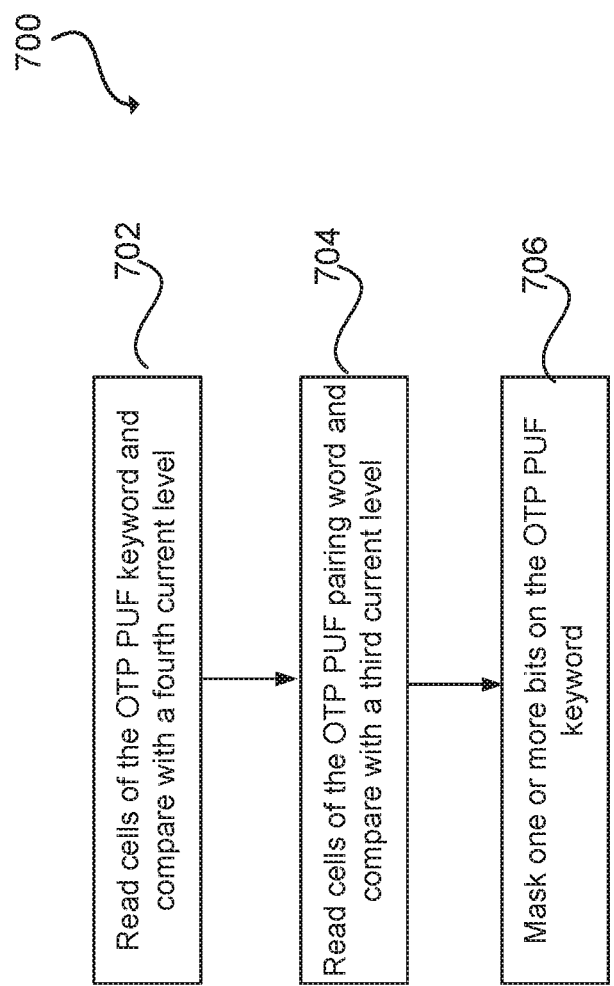
FIG. 7 depicts a flowchart for a process for reading a PUF key, in accordance with an embodiment of the present disclosure.

FIG. 7 depicts a flowchart for a process 700 for reading a PUF key in accordance with an embodiment of the present disclosure.

At 702, all the cells on the OTP PUF keyword (i.e., the first OTP anti-fuse) are read and compared with a fourth current level $I_{cell\_2}$. The fourth current level $I_{cell\_2}$ may be as shown in FIG. 2, where Ica' 2 equals to 0.65 in this example.

At 704, all the cells on the OTP PUF pairing word (i.e., the second OTP anti-fuse) are read and compared with the third current level $I_{cell\_0}$ as indicated in FIG. 2. FIG. 8 illustrates a read out of the OTP PUF keyword and the OTP PUF pairing word during application read, in accordance with an embodiment of the present disclosure. Table 800 shows the read out for the OTP PUF keyword 802 and the read out for the OTP PUF pairing word 804. For the OTP PUF keyword 802, all cell position having the OTP PUF keyword state 502 as binary 0 are read as binary 0, cells having the OTP PUF keyword state 502 as binary 1 are read as binary 1, and cells having the OTP PUF keyword state 502 as binary 0/1 are read as either binary 0 or 1. For the OTP PUF pairing word 804, all unprogrammed cells are read as binary 0 and all programmed cells are read as binary 1 as expected from FIG. 6.

At 706, the uncertain bits on the OTP PUF keyword are masked out based on the read out of the OTP PUF pairing word. FIG. 9 illustrates a read out of the PUF key during application read, in accordance with an embodiment of the present disclosure. Table 900 shows the OTP PUF keyword 902 and the cell position 904. Table 900 is derived from table 800. For example, for cell position cell0 the OTP PUF keyword is read as binary 1 and the corresponding OTP PUF pairing word is read as binary 0 (from table 800). Thus, binary 0 for the OTP PUF pairing word indicates that the OTP PUF keyword at cell position cell0 is not masked. For cell position $cell_3$ the OTP PUF keyword is read as binary 1 and the corresponding OTP PUF pairing word is read as binary 1. Binary 1 for the OTP PUF pairing word indicates that the cell position $cell_3$ is masked as shown in FIG. 9.

As discussed above, the cell current of programmed OTP anti-fuse cells might shift in the user life time and vary with the change of power supplies and environment temperature. The reference Ica' current may also have the variations of die-to-die processing, power supplies, temperatures, aging, and the like as would be understood by one of ordinary skill in the art. However, with the margin between $I_{cell\_1}$ and $I_{cell\_2}$ as well as the margin between $I_{cell\_3}$ and $I_{cell\_2}$, the overall stability of the present OTP PUF keyword is improved.

In one embodiment, the PUF key may require a balance of 0s and 1s as would be understood by one of ordinary skill in the art. In one embodiment, the balance can be easily achieved by generating more than a required number of PUF bits on one OTP PUF keyword and then masking out unbalanced bits (unwanted cells) by utilizing the OTP pairing word associated with the OTP PUF keyword. The unbalanced bit or unwanted cells correspond to memory cells in excess of the balance of 0s and 1s. If needed, multiple OTP PUF keywords and their OTP pairing words can be used to generate one PUF key. For example, to create a 256-bit PUF key, all cells on multiple OTP PUF keywords are programmed to get more than 128 of PUF 0s and more than 128 of PUF 1s. On the OTP pairing words of these multiple OTP PUF keywords, only 256 cells with the same cell positions as any 128 PUF 0s and any 128 PUF 1s are unprogrammed, while all other cells are programmed. Therefore, the programmed cells on the OTP pairing words represent not only the uncertain bits of the OTP PUF keywords, but also the unwanted PUF key bits. Thus, the number of 0s and 1s of one PUF key can be generated in balance.

In one embodiment, two or more OTP pairing words are assigned to a single OTP PUF keyword to improve the read out stability of the OTP PUF pairing words. For example, a third OTP anti-fuse may be programmed at step 310. During the reading of the PUF key, the two or more OTP PUF pairing words may be used together to identify the uncertain bits of the OTP PUP keyword.

In one embodiment, the memory cell may have a data storage element constructed around an ultra-thin dielectric, such as a gate oxide, and is used to store information by stressing the ultra-thin dielectric into breakdown to set the leakage current level of the memory cell. The memory cell is read by sensing the current drawn by the cell.

The OTP anti-fuses described herein may be a part of a memory integrated circuit that includes many other well-known elements such as sense amplifiers, pull-up circuits, word line amplifiers, decoders, voltage amplifiers, and the like.

The memory incorporating the OTP anti-fuse is preferably manufacturing using any advanced process that makes n-type gated devices, p-type gated devices, or both types of devices.

Figure 10:
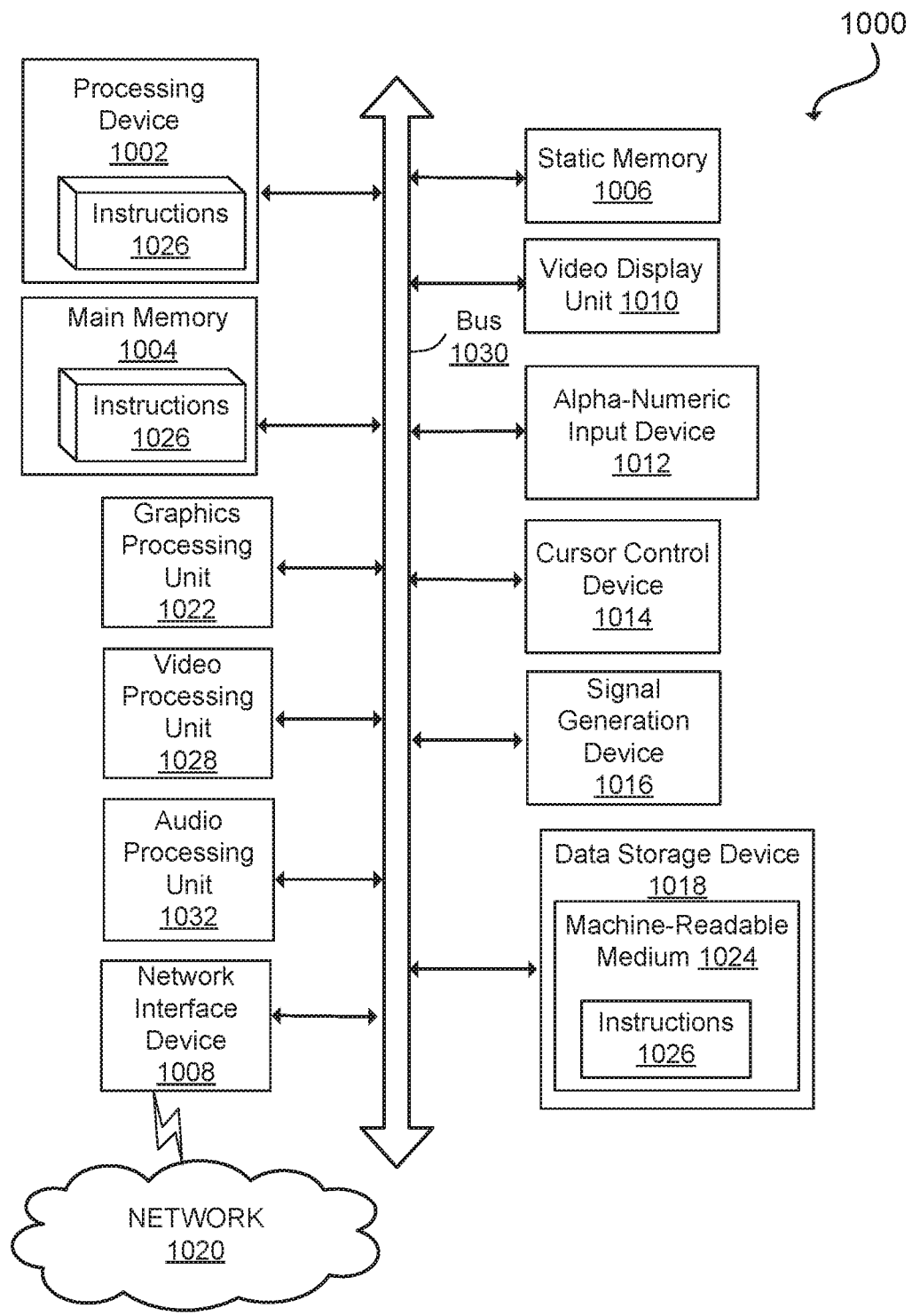
FIG. 10 depicts an abstract diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a local area network (LAN), an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method, comprising:
performing, by one or more computer devices, a first read operation on a memory cell of a programmed first one-time programmable (OTP) anti-fuse to determine a first state of the memory cell based on a first parameter level;
performing, by the one or more computer devices, a second read operation on the memory cell of the programmed first OTP anti-fuse to determine a second state of the memory cell based on a second parameter level;
identifying, by the one or more computer devices, the memory cell of the programmed first OTP anti-fuse as an uncertain bit when the first state determined during the first read operation and the second state determined during the second read operation are different; and
programing, by the one or more computer devices, one or more memory cells of a second OTP anti-fuse based on a bit position of the identified uncertain bit of the first OTP anti-fuse.

2. The method of claim 1, wherein a parameter value of the memory cell identified as the uncertain bit is between the first parameter level and the second parameter level.

3. The method of claim 2, wherein the parameter value corresponds to a conductivity of the memory cell, the first parameter level comprises a first conductivity level, and the second parameter level comprises a second conductivity level.

4. The method of claim 2, wherein the first parameter level comprises a first voltage level and the second parameter level comprises a second voltage level.

5. The method of claim 2, wherein the first parameter level and the second parameter level are threshold current levels selected based on a normalized memory cell current distribution of memory cells of the programmed first OTP anti-fuse.

6. The method of claim 1, wherein a programmed memory cell of the second OTP anti-fuse has a same bit position in the second OTP anti-fuse as the uncertain bit in the first OTP anti-fuse.

7. The method of claim 1, wherein a number of programed memory cells of the programmed first OTP anti-fuse is greater than a required number of bits in a physical unclonable (PUF) key.

8. The method of claim 7, further comprising:
programming a plurality of memory cells of the second OTP anti-fuse corresponding to unwanted memory cells, the unwanted memory cells corresponding to memory cells in excess of a balance between high state and low state memory cells of the first OTP anti-fuse based on the required number of bits.

9. The method of claim 1, further comprising:
programming one or more cells of a third OTP anti-fuse based on a bit position of the identified uncertain bit of the first OTP anti-fuse.

10. A method comprising:
performing, by one or more computer devices, a first read operation on a first plurality of memory cells of a first one-time programmable (OTP) anti-fuse;
performing, by the one or more computer devices, a second read operation on a second plurality of memory cells of a second OTP anti-fuse to determine a programming state of the second plurality of memory cells of the second OTP anti-fuse; and
masking, by the one or more computer devices, a portion of the first plurality of memory cells of the first OTP anti-fuse based on the second read operation, wherein the masked memory cells are based on the programming state of the second plurality of memory cells in the second OTP anti-fuse.

11. The method of claim 10, wherein performing the first read operation comprises:
associating a low state with a memory cell of the first OTP anti-fuse when a parameter value is lower than a first parameter level.

12. The method of claim 11, wherein the parameter value corresponds to a conductivity of the memory cell and the first parameter level comprises a first conductivity level.

13. The method of claim 12, wherein the first conductivity level is greater than a second conductivity level and lower than a third conductivity level, wherein the second conductivity level and the third conductivity level are based on a normalized memory cell current distribution of the first OTP anti-fuse.

14. The method of claim 13, wherein performing the second read operation comprises:
associating a high state with a memory cell of the second OTP anti-fuse when a conductivity of the memory cell of the second OTP anti-fuse is larger than the second conductivity level; and
identifying the uncertain bits of the first OTP anti-fuse as the first plurality of memory cells having a same position in the first OTP anti-fuse as the second plurality of memory cells of the second OTP anti-fuse having high states.

15. The method of claim 10, further comprising:
performing a third read operation on a third plurality of memory cells of a third OTP anti-fuse, wherein the masking of the portion of the first plurality of memory cells of the first OTP anti-fuse is further based on the third read operation.

16. A system comprising:
a memory storing instructions;
a first one-time programmable (OTP) anti-fuse;
a second OTP anti-fuse; and
a processor, coupled with the memory and configured to execute the instructions, the instructions when executed cause the processor to perform operations comprising:
programming a memory cell of the first OTP anti-fuse to provide a programmed first OTP anti-fuse;
perform a first read operation on the memory cell of the programmed first OTP anti-fuse to determine a state of the memory cell based on a first parameter level,
perform a second read operation on the memory cell of the programmed first OTP anti-fuse to determine a state of the memory cell based on a second parameter level,
identify the memory cell of the programmed first OTP anti-fuse as an uncertain bit when the state determined during the first read operation and the state determined during the second read operation are different, and
program one or more memory cells of the second OTP anti-fuse based on a bit position of the identified uncertain bit of the programmed first OTP anti-fuse.

17. The system of claim 16, wherein a parameter value of the memory cell identified as the uncertain bit is between the first parameter level and the second parameter level.

18. The system of claim 16, wherein a programmed memory cell of the second OTP anti-fuse has a same bit position in the second OTP anti-fuse as the uncertain bit in the first OTP anti-fuse.

19. The system of claim 16, wherein the processor is further configured to perform operations comprising:
program a plurality of memory cells of the second OTP anti-fuse corresponding to unwanted memory cells, the unwanted memory cells corresponding to memory cells in excess of a balance between high state and low state memory cells of the first OTP anti-fuse.

20. The system of claim 16, wherein the processor is further configured to perform operations comprising:
program one or more cells of a third OTP anti-fuse based on a bit position of the identified uncertain bit of the first OTP anti-fuse.

* * * * *